May 12, 1964 A. H. MEITZLER 3,133,258

ULTRASONIC STRIP DELAY LINE

Filed Oct. 21, 1960

INVENTOR
A. H. MEITZLER
BY
John K. Mullarney
ATTORNEY

United States Patent Office 3,133,258

Patented May 12, 1964

3,133,258
ULTRASONIC STRIP DELAY LINE

Allen H. Meitzler, Morristown, N.J., assignor to Bell Telephone Laboratories, Incorporated, New York, N.Y., a corporation of New York Filed Oct. 21, 1960, Ser. No. 64,186
7 Claims. (Cl. 333—30)

This invention relates to delay devices and in particular to solid ultrasonic delay lines.

Ultrasonic delay lines have in the past been designed primarily to provide nondispersive delays of radio frequency pulses. More recently, however, delay lines have been developed that deliberately provide dispersive delays. The terms "dispersive" and "nondispersive" refer to the delay versus frequency characteristics of a delay line. If the delay changes with frequency, the line is said to be "dispersive" and if the delay is constant, or nearly so, for all frequencies, the line is termed "nondispersive." Of the dispersive lines, the most useful designs are those for which the delays are very nearly linear functions of frequency.

Present forms of dispersive ultrasonic delay lines make use of the dispersive modes of elastic wave propagation that exist in certain simple geometrical configurations of isotropic solids. Dispersive mode propagation has been tried but not readily achieved in the known polygonal, disk-type delay line. Ultrasonic delay lines using longitudinal compression waves in rods, slabs or plates are known to be capable of supporting dispersive mode propagation, but these, for the most part, suffer from excessive conversion of energy into unwanted wave motions and modes. A strip delay line using a longitudinal mode of propagation has proven to be a useful arrangement for obtaining a delay characteristic that is very nearly a linear function of frequency. Unfortunately, sharp loss peaks in the pass band of the latter have frequently been encountered.

It is therefore an object of the present invention to achieve a dispersive delay with high efficiency and a minimum of unwanted mode conversion.

A further object is to provide a dispersive type delay line having a very smooth loss versus frequency characteristic curve.

Further objects are to eliminate the aforementioned sharp loss peaks and, in general, to more readily control the bandpass characteristics of strip delay lines.

In some transmission systems involving the time expansion and compression of pulses, a dispersive network is used to obtain a linear delay versus frequency dependence and a separate shaping or filter network is used to obtain a given band-limiting loss characteristic. A high degree of care must be exercised, however, in designing these separate networks to insure proper frequency alignment of the respective characteristics.

It is a still further object of the present invention that both of the above-noted functions be performed using a single delay line.

A related object of the invention is to provide a delay line having both a linear delay versus frequency characteristic and a corresponding, selectably limited bandpass characteristic.

In accordance with the present invention, these and other objects are realized in an asymmetrical tapered strip delay line whose width dimension is deliberately tapered to eliminate the parallelism of the minor surfaces. A tape layer, which acts as an absorber of elastic waves, is placed along the tapered minor surface and also on portions of both major surfaces in the vicinity of the tapered minor surface. Thickness-longitudinal-mode transducers are placed off center on the end faces of the line, immediately adjacent the untapered minor surface.

This arrangement selectively transmits energy over a limited frequency range centered on the frequency at which the generated longitudinal wave motion is able to satisfy the boundary conditions on the untapered minor surface. The delay achieved is very nearly a linear function of frequency. The taped, tapered minor surface effects a smooth sharp bandpass characteristic that is entirely free of loss peaks.

For a clearer understanding of the nature of the invention and the additional advantages and objects thereof, reference is made to the following detailed description taken in connection with the accompanying drawing in which.

Figure 1:
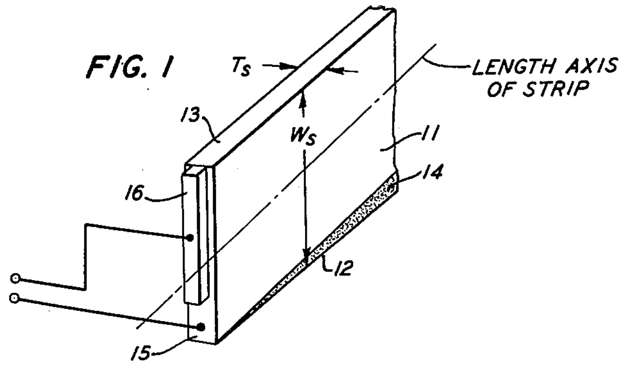
FIG. 1 is an enlarged fragmentary view of one end of a dispersive delay line constructed in accordance with the present invention.
Figure 2:
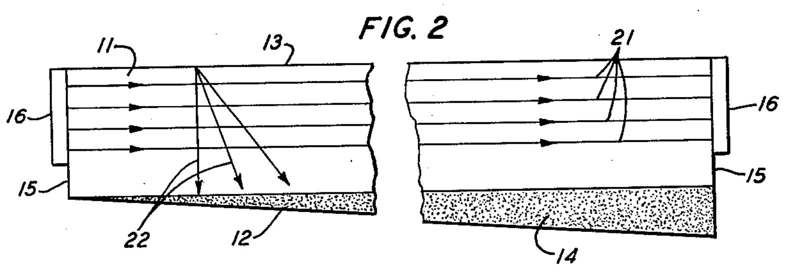
FIG. 2 is a broken, diagrammatic side elevational view of a typical delay line of the present invention.

Referring now to the drawing and particularly to FIGS. 1 and 2, there is shown a delay medium 11 in the form of a strip having a width dimension $W_s$, substantially greater than the thickness dimension $T_s$. Ideally, the delay medium should be an isotropic material, such as glass or vitreous silica, but polycrystalline materials such as ordinary metallic alloys (e.g., aluminum alloy, 5052–H32, having 95–97 percent aluminum, 2 percent magnesium, 0.2 percent chromium) have proven satisfactory provided grain size is sufficiently small compared to the wavelength of the elastic wave motion carried by the strip.

In accordance with the principles of the present invention, the minor surface 12 of the strip is deliberately tapered with respect to the other minor surface 13 so that the same are not parallel. As will be clear hereinafter, the degree or amount of taper is not critical. Experimentally, it has been found that a taper having a minimum rise of one unit for every five hundred units of length is satisfactory. There is no upper limit on the amount of taper, practical considerations of strip size and fabrication being the determinants here.

The tapered minor surface 12 and adjacent portions of the major surfaces are coated or covered with an absorber material 14, which can, for example, comprise an adhesive tape having a cloth or plastic type backing. As the name implies and as will be clear to those in the art, this material acts to absorb elastic waves incident upon the tapered minor surface. The absorber material on said adjacent portions of the major surfaces increases the total opportunity for interaction between the absorbent and said incident elastic waves. As illustrated in FIG. 2 of the drawing, the absorber material can cover entirely the extra portions of the major surfaces which are added by (i.e., result from) the taper. Thus, in this instance, the upper edges of the absorber material parallel the other minor surface 13. This extension of the absorber material on the major surfaces should not be exceeded, or undesirable absorption of the energy of the main beam will occur. Preferably, the extension of the absorbent on the major surfaces should be somewhat less than that illustrated in FIG. 2.

It will be noted, from FIG. 1, that the minor surface 13 is left free of absorber material.

The end faces 15 of the strip are perpendicular to the major surfaces and the untapered minor surface 13. Conventional piezoelectric ceramic transducers 16 in the form of rectangular bars are bonded to the end faces 15 using standard techniques. The transducers are poled and electroded, in a manner known in the art, such that they produce and respond to vibrations in a thickness-longitudinal-mode. Accordingly, when one of the transducers is excited by an alternating voltage applied to the electroded areas of the major surfaces thereof, a thickness-longitudinal-mode vibration is induced therein. This vibration in turn produces an elastic longitudinal wave motion in the strip which propagates down the line. When the propagated energy reaches the transducer at the opposite end, a thickness-longitudinal-mode vibration is induced therein and converted by the transducer to electrical energy. As will be clear to those in the art, the electrical and physical connections at each of the ends of the line are similar and therefore either transducer can be used as the input or output, i.e., the line is completely reciprocal.

To insure a radiated beam having a fairly narrow main lobe, the length of the transducers ($L_t$) should be of the order of ten or more wavelengths at the midband frequency of operation. The strip width $W_s$ should always exceed $L_t$, but the extent thereof is not critical. As will be described in greater detail hereinafter, the strip thickness $T_s$ is chosen so that the strip will propagate energy in the first longitudinal mode.

In accordance with the present invention, the transducers 16 are placed off center on the end faces 15, immediately adjacent the untaped minor surface 13. The upper ends of the transducers can be flush or nearly so with the surface 13 of the strip.

When the input transducer is energized in the aforementioned manner a longitudinal mode of elastic waves is propagated in the strip. The establishment of such a mode of propagation in a strip delay line has been shown to provide a delay characteristic that is nearly a linear function of frequency; see the article entitled "Dispersive Ultrasonic Delay Lines Using the First Longitudinal Mode in a Strip" by T. R. Meeker, I.R.E. Transactions on Ultrasonics Engineering, volume UE–7, No. 2, June 1960, pages 53–58.

The general theory and mathematics of propagation in elastic media has received extensive treatment in the literature; see, for example, "Longitudinal Modes of Elastic Waves in Isotropic Cylinders and Slabs" by A. N. Holden, Bell System Technical Journal, volume XXX, October 1951, pages 956–969; and "Wave Propagation in Elastic Plates: Low and High Mode Dispersion" by I. Tolstoy and E. Usdin, Journal of the Acoustical Society of America, volume 29, No. 1, January 1957, pages 37–42. The wave motion in a finite strip can be analyzed in terms of the wave motion in an infinite plate. And except for effects due to the minor surfaces of the strip, one can except that the results for the finite strip would approach the results predicted for the infinite plate. Accordingly, from the general equations which have been developed heretofore, one can derive, for the disclosed delay medium geometry, an expression for the frequency of optimum transmission. The frequency of maximum transmission (i.e., minimum loss) in the first longitudinal mode is given by the equation $$f_m = \frac{V_s\sqrt{2}}{2T_s}$$

where $T_s$ is strip thickness, and $V_s$ is the "free-space" velocity of shear waves in the delay medium and is equal to $(\mu/\rho)^{1/2}$, where $\mu$ is the shear modulus and $\rho$ is the density. At this frequency of maximum transmission the dilatational component of the longitudinal wave motion goes to zero, while the shear wave component remains finite.

With a given asymmetrical, tapered strip delay line, propagation in the higher order modes can only be accomplished at frequencies which are odd integral multiples of the frequency ($f_m$) given by the above equation. Accordingly, if the midband frequency of operation is made to equal frequency $f_m$, propagation in only the first longitudinal mode is assured.

FIG. 2 attempts to illustrate in simple diagrammatic fashion the principles of the present invention. The input transducer forms an ultrasonic beam represented by rays 21 which are parallel to the free minor surface 13 of the delay line. At the frequency $f_m$, given by the above equation, the beam is not disturbed by the presence of the free minor surface because at this frequency the longitudinal wave motion in the strip satisfies exactly the boundary conditions imposed by the presence of said minor surface. However, at frequency removed from $f_m$, the boundary conditions at the minor surface are not satisfied by the simple longitudinal wave motion being propagated and as a result one or more secondary wave motions 22 are generated that come off at some angle, or angles, with respect to the minor surface. That is, at frequencies away from $f_m$ the boundary conditions at the free minor surface are only satisfied by the generation of secondary wave motions and these remove energy from the original main wave.

Conversion of the energy of the main beam into secondary wave motions occurs irrespective of the positioning of the transducers on the end faces of the strip. Thus, the generation of these secondary wave motions also, expectedly, occurs in the prior art symmetrical (i.e., parallel major and minor surfaces) strip lines. However, it has now been determined that these secondary wave motions in symmetrical strip lines result in the establishment of standing wave motions in the width direction and it is these standing waves that cause the aforementioned sharp loss peaks. This conclusion has been demonstrated experimentally. The frequencies at which the loss peaks occur are in agreement with the frequencies at which modes of standing waves can exist in the width direction. These experiments support the instant interpretation that standing modes of vibration exist in a symmetrical strip having parallel minor surfaces and that these modes absorb substantial energy from the main mode of propagation, causing frequency-dependent loss peaks. In accordance with the instant invention, therefore, the possibility of standing waves in the width direction is eliminated by deliberately tapering the width of the strip to remove the parallelism of the minor surfaces. Tapered strip delay lines constructed in accordance with the invention have exhibited smooth bandpass characteristics entirely free of loss peaks, thus proving the validity of the above conclusions.

A further feature of the instant invention lies in its provision of a dispersive delay having highly selective band-limiting loss characteristics. To this end, the transducers 16 are placed off center on the end faces 15 as heretofore described. This enhances or increases the interaction between the radiated beam energy and the free minor surface at frequencies removed from $f_m$.

Heretofore, the resonant characteristics of the transducers and the tuned termination circuits determined the bandpass loss characteristics of a delay line. A feature of the instant line lies in the fact that by having the wave motion purposely interact with one minor surface as well as the two major surfaces of the strip, a bandpass loss characteristic is obtained that is independent of the transducers and tuned termination circuits. In the instant case, the bandpass loss characteristic is dependent solely on the form or configuration of the delay line.

Figure 3:
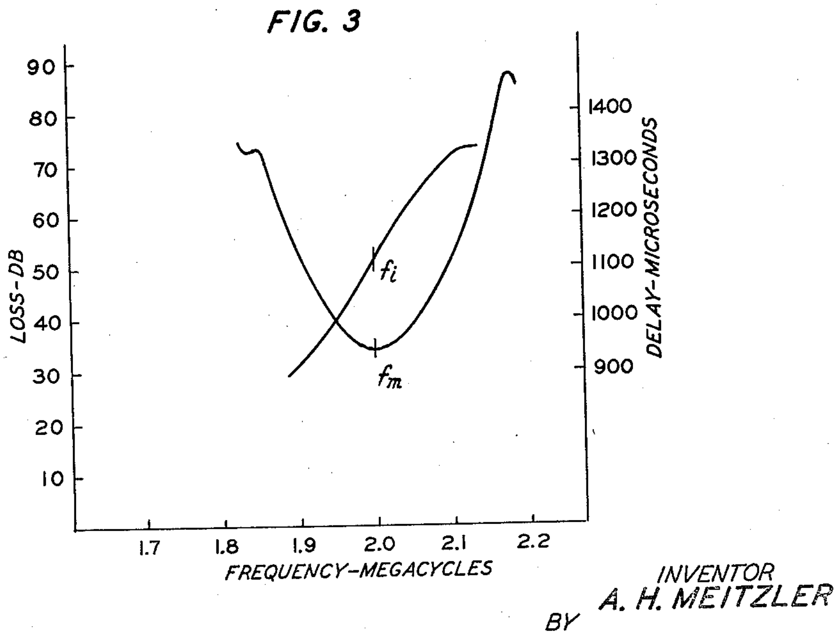
FIG. 3 shows loss versus frequency and delay versus frequency curves of a typical dispersive delay line constructed in accordance with the invention.

Delay lines of the configuration shown in FIGS. 1 and 2 have exhibited rather sharp bandpass loss characteristics. A typical, experimentally obtained, loss characteristic is shown in FIG. 3. The characteristic is centered at an $f_m$ of 2 mc., it has a 3 db bandwidth of approximately 100 kc., and a pass band with sides that slope rather steeply. The pass band is free of loss peaks as a result of the suppresion of standing waves as heretofore described.

It has been found that the slope of the sides of the pass band and the 3 db bandwidth are dependent upon the total length of the line. The qualitative explanation given above provides insight into why this is so. The longer the path length, the greater will be the opportunity for the wave motion in the main beam to interact with the free minor surface and undergo scattering (by means of mode conversion), if the frequency of the wave motion is different from $f_m$. Accordingly, the selection of line length provides control over the pass band as well as control over the amount of delay.

The dispersive delay characteristics of asymmetrical lines are the same, to within errors of measurement, as symmetrical lines made of the same material with the same thickness and length. FIG. 3 shows delay versus frequency and loss versus frequency characteristic curves of a typical asymmetrical delay line constructed in accordance with the present invention. The dimensions of this line were as follows:

| | | |
|---|---|---|
| Strip length | inches | 95.0 |
| Strip thickness | inch | 0.0437 |
| Strip width (one end) | do | 0.365 |
| Strip width (other end) | do | 0.530 |
| Transducer length | do | 0.350 |
| Strip taper | | linear. |

To insure satisfactory operation, the loss versus frequency and delay versus frequency characteristics of FIG. 3 should be aligned. That is, the frequency of maximum transmission ($f_m$) should coincide with the frequency ($f_i$) at which the inflection point in the delay versus frequency curve is located. The frequency of maximum transmission ($f_m$) is independent of the value of Poisson's ratio ($\sigma$) of the delay medium; but the frequency of the inflection point ($f_i$) of the delay versus frequency curve is dependent on the value of Poisson's ratio. The proper value of Poisson's ratio can be arrived at through a plot showing the manner in which these frequencies vary as a function of $\sigma$. If frequency is plotted as the ordinate and $\sigma$ the abscissa, $f_m$, which is constant, appears as a straight horizontal line. The plot of $f_i$ varies with $\sigma$ and intersects the plot of $f_m$. The curves intersect at a value of $\sigma$ substantially equal to 0.33. Hence, in an asymmetrical, tapered, strip delay line the medium must have a value of Poisson's ratio equal to 0.33 in order to have the frequency of maximum transmission center on the most linear region of the delay versus frequency characteristic. The aluminum alloy, 5052–H32, comes quite close to meeting this requirement.

As indicated above, one minor surface is tapered with respect to the other minor surface to remove the parallelism therebetween. While as a practical matter it is easier to fabricate a linear taper, the invention is not so limited and nonlinear tapers can be utilized to advantage. It is to be understood, therefore, that the foregoing disclosure relates to only a preferred embodiment of the invention and numerous modifications thereof can be made without departing from the spirit and scope of the invention.

What is claimed is:

1. In combination, an elongated thin strip of ultrasonic transmission material having end faces perpendicular to the major surfaces and one of the minor surfaces of the strip, the other minor surface of said strip being tapered with respect to the first-mentioned minor surface, and a pair of thickness-longitudinal-mode transducers mounted off center on said end faces immediately adjacent the untapered minor surface with the axes of launching and receiving of said transducers parallel to and offset from the longitudinal axis of said strip.

2. A delay line comprising an elongated thin strip of ultrasonic transmission material having end faces perpendicular to the major surfaces and one of the minor surfaces of the strip, the other minor surface of said strip being tapered with respect to the first-mentioned minor surface, absorber material covering said tapered minor surface and the major surfaces adjacent thereto, and a pair of thickness-longitudinal-mode transducers mounted off center on said end faces immediately adjacent the untapered minor surface with the axes of launching and receiving of said transducers parallel to and offset from the longitudinal axis of said strip.

3. A delay line as defined in claim 2 wherein the thickness of the strip $T_s$ is given as $$T_s=\frac{V_s\sqrt{2}}{2f}$$

where $f$ is the midband frequency of operation and $V_s$ is the free space velocity of shear waves in the delay medium and is equal to $(\mu/\rho)^{1/2}$, $\mu$ being the shear modulus and $\rho$ the density.

4. A delay line as defined in claim 3 wherein the transducers are at least ten wavelengths in length at the midband frequency and the width of the strip is greater than the transducer length throughout the length of the delay line.

5. A dispersive delay line comprising an elongated thin strip of ultrasonic material having a rectangular cross section throughout the length of the line with a width dimention many times that of the thickness dimension, said strip having one minor surface tapered with respect to the other minor surface, absorber material covering said tapered minor surface and the major surfaces adjacent thereto, a thickness-longitudinal-mode transducer mounted off center on one end of said strip adjacent the untapered minor surface for generating in said strip a first longitudinal mode elastic wave motion, and a thickness-longitudinal-mode transducer mounted off center on the other end of said strip adjacent the untapered minor surface for generating electrical signals in response to the longitudinal mode wave motion in the strip.

6. A dispersive delay line as defined in claim 5 wherein the thickness of the strip $T_s$ is given as $$T_s=\frac{V_s\sqrt{2}}{2f}$$

where $f$ is the midband frequency of operation and $V_s$ is the free space velocity of shear waves in the delay medium and is equal to $(\mu/\rho)^{1/2}$, $\mu$ being the shear modulus and $\rho$ the density.

7. A dispersive delay line as defined in claim 5 wherein said ultrasonic material has a Poisson's ratio of substantially 0.33.

References Cited in the file of this patent

UNITED STATES PATENTS

| | | |
|---|---|---|
| 2,485,722 | Erwin | Oct. 25, 1949 |
| 2,565,725 | Frederick et al. | Aug. 28, 1951 |
| 2,668,529 | Huter | Feb. 9, 1954 |
| 2,703,867 | Arenberg | Mar. 8, 1955 |
| 2,839,731 | McSkimin | June 17, 1958 |
| 2,859,415 | Fagen | Nov. 4, 1958 |
| 2,867,777 | Robinson | Jan. 6, 1959 |
| 3,041,556 | Meitzler | June 26, 1962 |

OTHER REFERENCES

Sutton: "Propagation of Sound in Plate-Shaped Solid Delay Lines" The Journal of the Acoustical Society of America, vol. 31, No. 1, January 1959, pages 34–42.